United States Patent Office 3,089,841
Patented May 14, 1963

3,089,841
REFINING PROCESS FOR PETROLEUM WAX
Edward B. Berkowitz, Brooklyn, N.Y., Theodore E. Makowski, Jersey City, N.J., Byron G. Spars, Madison, Wis., and Norton H. Berlin, Fords, N.J., assignors to Esso Research and Engineering Company, a corporation of Delaware
No Drawing. Filed Dec. 30, 1959, Ser. No. 862,754
7 Claims. (Cl. 208—27)

The present invention is concerned with the production of high quality petroleum waxes. This invention is more particularly concerned with a hydrofining treatment of petroleum waxes in order to improve color and odor and reduce content of carbonizable substances thereof. This invention is particularly concerned with an improved method of reactivating the catalyst that has been deactivated during wax hydrofining.

The problem of refining and stabilizing petroleum waxes and particularly paraffin wax for use in the preservation of foods and in the coating of food containers requires waxes which are free from odor and possess excellent color and stability. Numerous processes have been suggested to improve the quality of paraffin waxes including clay treating, acid and caustic washing, hydrogenation and hydrofining and combinations of hydrofining and treatment with an adsorbent such as bauxite, alumina, silica gel or activated charcoal.

In general, these processes have proved to be unsatisfactory for one reason or another. Some of the processes are objectionable because of low yields, or low quality of product or non-uniformity of product. Hydrofining processes which have the potential of offering substantial commercial advantages in comparison with acid-caustic treatment or treatment with adsorbents, have not proven entirely satisfactory either because the mild, selective conditions employed to avoid undesirable side reactions do not give sufficient improvement in the properties of the treated waxes or catalyst life, particularly of the more active catalysts, has been too short to be commercially attractive.

Prior to the present invention, catalyst deactivation made it necessary to recycle the hydrofined wax back through the reactor in order to obtain the necessary product quality. When catalyst deactivation became a problem, it was necessary to regenerate the catalyst under very closely controlled conditions and with some catalysts it was even necessary to replace the catalyst to avoid excessive recycle of the wax product, but this was only possible if catalyst stock piles were available and the hydrofiner was not in use. If this were not the case, recycle of the product was the only alternative.

It is an object of this invention to provide the art with an improved method of treating petroleum waxes with hydrogen in the presence of a solid catalyst to form products possessing excellent color, odor and stability characteristics.

It is also an object of this invention to provide a process for treating petroleum waxes with hydrogen in the presence of solid catalysts to form products possessing uniformly excellent color, odor and stability characteristics for extended periods of time. It is a further object of this invention to provide a method of reactivating the catalysts used in the hydrofining of petroleum waxes to a degree of activity which will enable the production of high quality wax in a once-through process.

These and other objects will appear more clearly from the detailed specification which follows.

It has now been found that the activity of hydrogenation catalysts which have become deactivated in the hydrofining of hydrocarbon wax can be greatly improved by continuing to operate the wax hydrofining process in the usual manner with the exception of increasing the operating temperature from a normal of about 450–600° F. to about 650–700° F. for a period of six hours or more, whereupon the temperature is again reduced to about 450–600° F. Although the product obtained during this reactivation may not meet highest quality specifications it can be sold as lower quality material, blended off with higher quality material or recycled when lower temperature operation is resumed to convert it to highest quality material. By this simple and economical procedure, the activity of the deactivated catalyst can be greatly increased and the reactivated catalyst can be continued in service producing highest quality hydofined wax in satisfactory yields for prolonged periods before reactivation is again required.

It has further been found that this reactivation procedure can be applied with particular advantage in the hydrofining of petroleum waxes with cobalt molybdate catalyst in a reactor system using an inverse temperature gradient in a single reactor or a system having two or more reactors in series with a substantially lower temperature maintained in each succeeding reactor. In this way, the wax is first hydrofined at a high temperature to obtain an initial rapid improvement in quality and then at lower temperatures to take advantage of the more favorable chemical equilibrium. Catalyst requirements for wax hydrofining can be reduced as much as one-half by this inverse temperature gradient technique. Of even greater importance is the fact that highest quality products of excellent stability are produced for prolonged periods by the use of the reactivation technique of this invention.

Before entering into a more detailed description of the present invention, it is well to have in mind the procedures that are usually employed for evaluating a hydrocarbon wax insofar as its color, odor, stability and carbonizable matter content are concerned. Thus, the color of a wax is generally evaluated by either the Saybolt or Tag-Robinson method of color determination, both of which are standard tests in the petroleum industry. Descriptions of these methods can be found in the "New and Revised Tag Manual for Inspectors of Petroleum" published by the C. J. Tagliabue Manufacturing Company. In view of the fact that it is necessary to show color comparison in the data of the present description, the percent reduction in these absolute color units will be referred to. This percent reduction in absolute color units is easily computed when using either the Saybolt or Tag-Robinson method of color determination, and therefore provides a method of comparison when either color determination method is used.

The odor characteristics of such waxes are determined in various ways. In general, either wax shavings or vapors from the wax are sniffed by a committee composed of a minimum of three persons. The wax is then rated by each committeeman using a number system. The wax is rated on both odor type and intensity of the odor.

The stability of a wax is generally determined by performing color and/or odor tests upon the wax before and after it has been subjected to extended storage periods at elevated temperatures. Several different tests are conventionally employed for this purpose.

The carbonizable matter content of a wax is conventionally determined in accordance with the USP procedure for readily carbonizable substances. This test is described in detail in ASTM Test Procedure D–565. In general, the test consists of mixing a wax with concentrated sulfuric acid at a particular temperature and for a particular length of time and them comparing the color of the resulting acid layer from the test with a set of standard colors.

The USP acid test procedure for determining the amount of carbonizable substances in a hydrocarbon wax has limited accuracy and range. It is intended for use and is suitable only within the range of fully refined paraffin waxes, which contain relatively small amounts of carbonizable substances. A more flexible procedure applicable over a much wider range, and therefore particularly useful in studying the effectiveness of treating processes, has been developed. This procedure consists essentially of determining the optical density of a wax at a wave length of 330 millimicrons (K330). This testing procedure has been careffully correlated with the results that are obtained with the USP procedure and it has been found that the new procedure is much more reliable and consistent. In view of this fact, some of the data in the present description which relate to improvement of this particular property of a wax by the hydrofining treatment in accordance with this invention, are expressed in terms of the reduction in optical density.

The petroleum waxes treated in accordance with the present invention are the waxy components which boil in the range of from about 670° F. to 900° F. at atmospheric pressure. The waxes are composed principally of normal paraffins of about the $C_{20}$ to $C_{32}$ range. The waxes are deoiled to less than 1% and preferably to less than 0.5% oil content and have melting points of from 115° F. to 155° F. The crude wax feed to the process has a color (Tag-Robinson) as low as 4 to 20 and a USP Acid as high as 80 (measured by dilution with white oil). In order to meet quality specifications the refined wax should be essentially colorless, odorless and tasteless, should have a +25 to +30 Saybolt color or better and USP acid of 5 or less. In addition the refined wax should be odorless and must have good odor stability, a wax which retains good color in an accelerated test (16 hours at 230° F.) being considered satisfactory.

The hydrofining of the wax can be effected in any suitable reactor. In view of the fact that the catalysts used herein retain their activity for prolonged periods of time, fixed bed reactors are entirely suitable. Flow may be downflow or upflow in the reactor although ordinarily downflow operation is preferred since it minimizes thermal exposure time and when running a series of waxes in blocked operation, downflow minimizes the volume of slop cuts between various grades. If a temperature gradient is utilized in a single reactor vessel, suitable means such as cooling coils or other suitable heat transfer means are required to maintain the reaction mixture at the desired temperature levels in the low temperature zone. If the reactor system comprises two or more vessels in series, suitable cooling means can be arranged between the vessels or the succeeding vessels may be provided with suitable heat transfer means to maintain the desired temperature in each vessel. It is preferred that the hydrogen treat gas be combined with the wax feed before heating the reaction mixture up to initial reaction temperature.

The catalysts used for hydrofining waxes in accordance with this invention are hydrogenation catalysts, cobalt molybdate or mixtures of cobalt oxide and molybdenum oxide dispersed upon an alumina support or carrier, molybdenum sulfide, nickel-tungsten sulfide, nickel on kieselguhr or the like. The cobalt molybdate catalysts are generally preferred and may be prepared by first forming adsorptive alumina particles in any suitable way and then compositing molybdenum oxide and cobalt oxide therewith. The molybdenum oxide can be added as a slurry or as a solution of ammonium molybdate. The cobalt oxide is conveniently added as a salt such as cobalt nitrate or acetate, salts which are readily decomposed to cobalt oxide and volatile material. The cobalt oxide and molybdenum oxide may be provided in equilmolar amounts or a molecular excess of one over the other may be used. Suitable catalysts contain from about 5 to about 25 wt. percent of cobalt oxide and molybdenum oxide with the ratio of the former to the latter in the range of from about one to five to about five to one. In order to improve the activity of the cobalt oxide-molybdenum oxide hydrofining catalysts it is preferred to sulfide the same prior to use as by treatment with a suitable sulfiding agent such as hydrogen sulfide, carbon disulfide, ethyl mercaptan or the like, preferably in the presence of hydrogen. The amount of sulfur added is preferably at least 25% of the stoichiometric quantity necessary to convert the catalytic metal oxides to the corresponding sulfides.

Relative to the nickel catalysts which may also be used in the hydrofining of waxes, it should be pointed out that the exact chemical nature of the nickel on the final catalyst is not known with any degree of certainty. As the catalyst is initially prepared, it appears that the nickel is in the form of an oxide; but upon activation with hydrogen, it further appears that the nickel is converted to a different oxide, a mixture of oxides, or even to the metal itself. In any event, the color of the catalyst as initially prepared is generally greenish in hue, and the color changes to black upon activation.

These catalysts consist chemically of nickel impregnated on a solid adsorbent carrier. The carrier may be selected from many materials, such as silica gel, activated char, alumina, magnesia, and the like, which are usually employed for this general purpose. A material which is particularly preferred as a carrier, however, is kieselguhr. Furthermore, it is prefered that the impregnated carrier contain at least 10 wt. percent nickel oxide and preferably from 50 to 75 wt. percent of this compound. About 65 wt. percent nickel oxide has been found to be especially effective.

The hydrofining of the wax feed is effected at pressures above about 200 p.s.i.g., preferably at about 600 p.s.i.g. Higher pressure of up to about 1000 p.s.i.g. can also be used but ordinarily the higher cost of equipment to withstand such pressures and the higher cost of operation at higher pressures makes it uneconomic to use pressures above about 800 p.s.i.g.

The temperature maintained in the wax hydrofining zone is in the range of from about 400–650° F. during hydrofining, and at a temperature about 100° F. higher than the hydrofining temperature during catalyst regeneration. In the case of a two-stage process with the cobalt oxide-molybdenum oxide catalysts, the temperature in the first stage or pass in the wax hydrofining operation is between about 550° and 650° F., preferably at about 600° F. The temperature in the second stage or zone should be at least 100° F. lower than in the first stage and generally is between about 400° F. and 500° F., preferably about 450° F. The feed rate in the first stage is about 3 to 5 v./v./hr. preferably about 4.4 v./v./hr. at 600° F. and about 1 to 2 v./v./hr. preferably about 1.75 v./v./hr. at 450° F. in the second stage.

Hydrogen or hydrogen-rich treat gas is supplied with the feed wax at rates of from 150 to 750 s.c.f. per barrel of liquid feed. The treat gas preferably should contain at least 90 vol. percent of hydrogen.

When the waxes, which have been hydrofined in the once-through methods described, do not have sufficient quality to pass the tests previously described, it becomes necessary to reactivate the catalyst. Catalyst deactivation is usually associated with the deposition of unconverted polymeric or unsaturated high molecular weight material on active catalyst sites. Therefore increased hydrogenation severity will reactivate a deactivated catalyst by hydrogenation of the deactivating materials. The reactivation of the catalyst is usually carried out in the following manner. The feed stream of wax or wax and hydrogen treat gas is heated to a temperature of from about 600 to 700° F., preferably about 650° F. and charged to the hydrofining reaction zone. All hydrofining conditions are maintained at the normal values except the feed temperature.

In temperature gradient hydrofining, the low temperature reaction zone is usually the first to deactivate due to unconverted contaminants leaving the high temperature zone. The relatively mild hydrogenation conditions that exist in the low temperature zone cannot effectively prevent deposition of polymeric substances on active sites. The result is catalyst deactivation. However, simply raising the temperature of this low temperature zone to 550° to 650° F., preferably 600° F., will adequately reactivate the catalyst due to increased hydrogenation severity.

The high temperature zone can also deactivate for similar reasons. However here, the deactivation is caused by even more difficult to hydrogenate materials. Therefore even higher temperatures are required, e.g. 600° to 700° F., preferably 650° F.

It is impotrant to stress that hydrogenation of these deactivating substances does not occur rapidly and sufficient time should be allowed for their removal, e.g. 24 to 72 hours, peferably 48 hours, although in the case of some catalysts, particularly the nickel catalyst substantial reactivation can be obtained in from about six to twelve hours.

After the reactivation period, temperatures can be returned to normal hydrofining conditions. Catalyst activity will return to the level obtained before deactivation occurred and the catalyst should not require reactivation for at least two weeks.

The product produced during this auto-reactivation process is of a lower grade than that produced during normal operations. Even though being of lower grade, it is still of economic value and can be blended with other waxes which are not to be used in contact with food, drugs, or cosmetics or where good appearance quality is not required. It can also be recycled when low temperature or normal operation is resumed.

The following examples are illustrative of the present invention.

*Example I*

The conditions in normal hydrofining of petroleum waxes with nickel on reactivation of these nickel hydrofining catalysts are set forth in tabular form below.

HYDROFINING CONDITIONS

|  | Normal | Range |
|---|---|---|
| Temperature, °F | 525 | 450–600 |
| Pressure, p.s.i.g | 200 | 195–600 |
| Feed Rate, v./hr./v | 1.5 | 1.0–1.75 |
| $H_2$ Feed, s.c.f./b | 200 | 150–250 |
| $H_2$ Consumption, s.c.f./b | 10 | 3–15 |

REACTIVATION CONDITIONS

|  | Preferred | Range |
|---|---|---|
| Temperature, °F | 700 | 650–700 |
| Pressure, p.s.i.g | 200 | 195–600 |
| Feed Rate, v./hr./v | 1.1 | 1.1–1.2 |
| $H_2$ Feed, s.c.f./b | 200 | 150–250 |
| $H_2$ Consumption, s.c.f./b | 15 | 15 |

A specific operation illustrating this invention is as follows.

A deoiled paraffin wax feed having a melting point of about 133° F., an oil content of about 0.2% and a Tag-Robinson color of 20 was hydrofined over a hydrofining catalyst comprising 45% nickel oxide supported on a kieselguhr base. The catalyst which was in the shape of 1/8-inch pills had been used for approximately 1½ years and the activity of the catalyst had been steadily declining during this time. The hydrofining conditions were as follows:

Temperature, °F _____ 450
Pressure, p.s.i.g _____ 200
Feed rate, v./hr./v _____ 1.5
$H_2$ feed, s.c.f./b _____ 200
$H_2$ consumption, s.c.f./b _____ 10

The hydrofined wax showed the following improvements:

Percent reduction in absolute color units _____ 46
Percent reduction in K330 _____ 6.2

The deoiled wax feed was then heated to a temperature of 700° F. and operation at this temperature was continued for six hours.

At the end of the six-hour period, the deoiled feed temperature was reduced to 450° F. and the feed was again hydrofined as before. The wax product showed the following improvements.

Percent reduction in absolute color units _____ 86
Percent reduction in K330 _____ 12.2

This data show that it is possible to double the activity of a used nickel hydrofining catalyst and that a product of sufficient quality for commercial use can be produced by a once-through hydrofining treatment when using a catalyst reactivated in this manner.

The reactivated catalyst was found to be of sufficient activity to produce a product of sufficient quality to pass all required quality tests for approximately two weeks.

*Example II*

A wide-cut San Joaquin crystalline wax having a color of −16 Saybolt and a USP acid of 20 was hydrofined in a temperature gradient operation. The catalyst used was 10–14 mesh particle size cobalt molybdate catalyst. The operating pressure was 600 p.s.i.g. with a treat gas rate of 500 s.c.f./b. of 100% hydrogen. Two reactors were used, connected in series flow. Inlet temperature to the first reactor was 570° F. and outlet temperature was 520° F. The gas/wax mixture then passed through a short transfer line to the second reactor, which was operated at 450° F. inlet temperature and 400° F. outlet temperature. Catalyst loading was equivalent to 3.0 v./v./hr. in the higher temperature reactor and 1.5 v./v./hr. in the lower temperature zone. Overall feed rate was 1.0 v./v./hr. The catalyst was activated prior to this operation by treating it with a gas containing 3% $H_2S$ and 97% hydrogen at 600° F. and 600 p.s.i.g. for 10 hours. Sufficient sulfur to convert 50% of the cobalt and molybdenum to the corresponding sulfides was passed over the catalyst. The results from this temperature gradient operation are shown below and compared with results from constant temperature runs:

|  | Constant Temperature | | Temperature Gradient |
|---|---|---|---|
|  | 600° F. | 400° F. |  |
| Product Color, Saybolt | <+27 | +30 | +30 |
| Product USP Acid | 5 | 3 | 2 |
| V./v./hr | 0.5 | 0.5 | 1.0 |

To achieve the same degree of conversion at constant temperature required half the v./v./hr., that is to say, twice the volume of catalyst at the same wax feed rate, as did the temperature gradient run. In the constant temperature runs, all other conditions (pressure, treat gas rate and composition, catalyst) were the same as cited above for the temperature gradient run.

After several hundred hours of operation the color of the product degraded. Raising the temperature of the second reactor to about 575° F. for about forty-eight hours is sufficient to restore the activity of the catalyst and upon reduction of the temperature of the second reactor to the original level (450° F. inlet and 400° F. outlet) allows the attainment of 30+ Saybolt specification product.

*Example III*

A Panhandle crystalline wax having a color of 5 TR and a USP acid of approximately 80 (back-calculated from USP acid of a diluted sample) was hydrofined using a two-pass technique with the first pass at high temperature and the second pass at a lower temperature. As in Example II, pressure was 600 p.s.i.g., with 500 s.c.f./b. of 100% hydrogen used as treat gas, and the catalyst was activated by treating it with 3% $H_2S$/97% hydrogen.

The Panhandle wax was first hydrofined at 600° F. and 1 v./v./hr. The product from this operation was then repassed over the catalyst in blocked operation at 1 v./v./hr. and at temperatures of 275° F., 400° F., 500° F., and 600° F. The results of these runs are shown below, and compared with results from constant temperature operation at the same overall v./v./hr.

|  | Constant Temperature | | Two-Pass Operation [1] | | | |
| --- | --- | --- | --- | --- | --- | --- |
|  | 400° F. | 600° F. | 275 | 400 | 500 | 600 |
| Product Color, Saybolt | −9 | +22 | +30 | +30 | +30 | +26 |
| Product USP Acid | 16 | 8 | 3 | 3 | 5 | 8 |
| Overall, v./v./hr | 0.5 | 0.5 | 0.5 | 0.5 | 0.5 | 0.5 |

[1] First pass at 600° F. and 1 v./v./hr.; second pass at 1 v./v./hr. and indicated temperature.

These results show that best results are obtained when the second pass is run at low temperatures, and that it is not possible to obtain as good results by constant temperature operation at the same overall v./v./hr.

*Example IV*

A San Joaquin heavy crystalline wax having a 12¼ T.R. color and an estimated USP acid of 32 was hydrofined in a two-pass process. The catalyst and the presulfiding treatment were the same as in Example II. The feed was first hydrofined in one reactor at 600° F. and 600 p.s.i.g. at a feed rate of 5 v./v./hr. in admixture with 200 s.c.f./b. of 100% hydrogen treat gas.

The product from the first reactor was then used as feed for the second reactor in which the temperature and feed rate were varied. The pressure in the second reactor was 600 p.s.i.g.; the treat gas rate was 200 s.c.f. of 100% hydrogen per barrel of wax feed. The results of this two-temperature, two-pass operation are tabulated below.

|  | Color, Say. | USP Acid | Overall, v./v./hr. |
| --- | --- | --- | --- |
| First Pass Product (600° F., 5 v./v./hr.) | +18 | 7 | 5.0 |
| Second Pass Product: |  |  |  |
| 500° F., 3 v./v./hr | +27 | 4 | 1.9 |
| 450° F., 5 v./v./hr | +20 | 4 | 2.5 |
| 450° F., 2 v./v./hr | +28 to +30 | 4 | 1.4 |
| 400° F., 1 v./v./hr | +28 | 4 | 0.83 |

These data show the necessity for a second reactor at a lower temperature where a more favorable equilibrium exists for the +30 Saybolt color specification. At 450° F. and 2 v./v./hr. in the second reactor, colors of +20 to +30 were obtained with an overall flow rate of 1.4 v./v./hr., whereas +27 Saybolt was the best color obtainable at 1.4 v./v./hr. feed rate in any constant temperature run with this wax feed.

*Example V*

A San Joaquin heavy deoiled wax having a 12¼ T.R. color and USP acid of 32 (estimated by white oil blending) was hydrofined in a two-pass system with a cobalt molybdate catalyst as described above. The pressure in both reactors was 600 p.s.i.g. and the temperature at the inlet of the first reactor was 600° F. and the temperature at the inlet of the second reactor was 450° F. and the overall feed rate was 1.25 v./v./hr. After several hundred hours of operation, the hydrofined wax has a 30+ Saybolt color and USP acid of 3. After a period of operation of less than 100 hours with a lower quality wax feed, the color of the product dropped to a low of 22 Saybolt. When the same Jan Joaquin heavy deoiled wax as originally charged was again charged to the temperature gradient system it was only upgraded to +26 T.R. and the USP acid was 4. The second reaction stage was then increased to 600° F. inlet temperature for forty-eight hours during which a 26–28 Saybolt color product was formed. Upon then reducing the inlet temperature to the second reactor to the original vale of 450° F., +30 Saybolt color and 3 USP acid product was again formed.

*Example VI*

A Panhandle crystalline wax of 130° F. melting point and containing 0.2 wt. percent oil having a 9¾ T.R. color and 70 USP acid (estimated by white oil blending), was hydrofined using cobalt molybdate catalyst presulfided as described above in a two-stage operation. The pressure in both reaction stages was 670 p.s.i.g. and the inlet temperature to the first stage was 600° F. and to the second stage 450° F. The overall feed rate was 1.25 v./v./hr. and the hydrogen feed rate 200 s.c.f./bbl. and the hydrogen consumption was less than 10 s.c.f./bbl. When the catalyst was fresh, the hydrofined product had a color of +30–35 Saybolt and the percent color reduction (based on absolute color units) was 99.4%.

After several hundred hours of operation the product color dropped to +26. The inlet temperature to the second reactor was then increased to 600° F. for about one to two days during which period the color dropped to as low as +16 and then levelled off at about +22. When the inlet temperature to the second reactor was dropped to 450° F. the product color improved to about +30 Saybolt.

After less than one day of operation at the restored original conditions, the color again fell below specification, dropping as low as +19. At this point both reactors were reactivated by increasing the inlet temperature to the first reactor to 650° F. and the inlet temperature to the second reactor to 600° F. Other reaction conditions, pressure, feed rate and hydrogen treat gas rate were maintained the same as originally used. The hydrofined wax produced during the reactivation period had about +23 Saybolt color and was above 5 USP acid. After 48 hours at the reactivation conditions the temperatures were reduced to 600° F. inlet temperature to the first reactor and 450° F. inlet temperature to the second reactor. The hydrofined product promptly improved to +30 Saybolt color and USP acid of 4 or less and products of this quality were obtained for upwards of 150 hours.

The advantage of this invention will be apparent to those skilled in the art. The principal advantage is the freedom of operation which this invention gives since shutdowns during rush periods are no longer required and operation is not dependent on catalyst reserve which may or may not be available. The invention eliminates recycle in order to bring the product up to required standards and thereby increases the capacity of the reactor. By the use of this invention, catalyst life is extended and catalyst requirements are reduced over a long period of time. Also, a valuable product is produced during the time required for catalyst activation.

The foregoing description contains a limited number of embodiments of the present invention. It will be understood that numerous variations are possible without departing from the scope of the following claims.

What is claimed is:

1. A method for hydrofining petroleum waxes which comprises contacting the wax in admixture with hydrogen, and a hydrogenation catalyst under hydrofining conditions in a reaction zone at a temperature in the range of 400 to 650° F., thereby producing a high quality wax, continuing to supply wax to said reaction zone under said hydrofining conditions until the catalyst has become deactivated due to the adsorption of catalyst deactivating contaminants to a point where high quality wax is no longer produced; increasing the reaction temperature to a temperature of at least about 100° F. above the hydrofining temperature at which said high quality wax was obtained and at which said catalyst deactivating contaminants were adsorbed on said catalyst; continuing to feed said wax through said reaction zone at said higher temperature for a period from about 6 to about 72 hours during which time the said catalyst deactivating materials are removed from the catalyst, then lowering the temperature in the said reaction zone to about said first hydrofining temperature to again produce high quality wax.

2. A method for hydrofining petroleum waxes which comprises contacting the wax in admixture with hydrogen, and a hydrogenation catalyst under hydrofining conditions in a reaction zone at a temperature in the range of about 450–600° F., thereby producing a high quality wax, continuing to supply wax to said reaction zone under said hydrofining conditions until the catalyst has become deactivated due to the adsorption of catalyst deactivating contaminants to a point where high quality wax is no longer produced; increasing the reaction temperature to a temperature in the range of about 650–700° F. and at least about 100° above the hydrofining temperature at which said high quality wax was obtained and at which said catalyst deactivating materials were adsorbed on said catalyst; continuing to feed said wax through said reaction zone at said higher temperature for a period of about 6 to about 72 hours during which time the said catalyst deactivating materials are removed from the catalyst, then lowering the temperature in the said reaction zone to about 450–600° F. to again produce high quality wax.

3. A method for hydrofining petroleum waxes which comprises contacting the wax in admixture with hydrogen, and a hydrogenation catalyst from the group consisting of nickel oxide and cobalt oxide-molybdenum oxide under hydrofining conditions in a reaction zone at a temperature in the range of about 450 to 600° F. and at a pressure in the range of 200 to 1000 p.s.i.g. thereby producing a high quality wax which is essentially colorless, odorless, and tasteless, having a +25 to +30 Saybolt color or better and a USP acid of not more than 5; continuing to supply wax to said reaction zone under said hydrofining conditions until the catalyst has become deactivated due to the adsorption of catalyst deactivating contaminants to a point where high quality wax of the aforesaid specifications is no longer produced; increasing the reaction temperature to a temperature in the range of about 650–700° F. and at least 100° above the hydrofining temperature at which said high quality wax was obtained and at which said catalyst deactivating materials were adsorbed on said catalyst; continuing to feed said wax through said reaction zone at said higher temperature for a period from about 6 to about 72 hours during which time the said catalyst deactivating materials are removed from the catalyst, then lowering the temperature in the said reaction zone to about 450–600° F. to again produce high quality wax of the aforesaid specifications.

4. A method for hydrofining petroleum waxes boiling in the range of 670° F. to 900° F. and composed principally of normal paraffins of about $C_{20}$–$C_{32}$, carbon length, having an oil content of less than 1% and a melting point in the range of 115 to 155° F., which comprises contacting the wax in admixture with hydrogen, and a hydrogenation catalyst under hydrofining conditions in a reaction zone at a temperature in the range of about 450 to 600° F. and at a pressure in the range of 200 to 600 p.s.i.g., thereby producing a high quality wax which is essentially colorless, odorless, and tasteless, having a +25 to +30 Saybolt color or better and a USP acid of not more than 5; continuing to supply wax to said reaction zone under said hydrofining conditions until the catalyst has become deactivated due to the adsorption of catalyst deactivating contaminants to a point where high quality wax of the aforesaid specifications is no longer produced; increasing the reaction temperature to a temperature in the range of about 650–700° F., continuing to feed said wax through said reaction zone at said higher temperature for a period from about 6 to about 72 hours during which time the said catalyst deactivating materials are removed from the catalyst, then lowering the temperature in the said reaction zone to about 450–600° F. to again produce high quality wax of the aforesaid specifications.

5. The method of upgrading petroleum waxes which comprises contacting the wax in admixture with hydrogen and a hydrogenation catalyst under hydrofining conditions in a first containing zone at a temperature in the range of about 550 to 650° F. and treating the reaction mixture from the first contacting zone in a second contacting zone in admixture with hydrogen, and a hydrogenation catalyst under hydrofining conditions at a temperature in the range of about 400 to 500° F. and at least 100° F. lower than the temperature in the first contacting zone, to obtain a high quality wax product from the second contacting zone, continuing this procedure until the catalyst has declined in activity, due to the adsorption of catalyst deactivating contaminants, to the extent that high quality wax product is no longer produced, thereupon increasing the temperature of the feed to the first contacting zone to about 600 to 700° F. to reactivate the catalyst in the first contacting zone, and increasing the temperature of the feed to the second contacting zone to a temperature of about 550 to 650° F. to reactivate the catalyst in the second zone, while maintaining the first and second stages at said higher temperatures for a period of up to about 48 hours to effect removal of the catalyst deactivating contaminants from said catalyst, and thereupon reducing the temperature of the feed to the first zone to about 550 to 650° F. and temperature of the feed to the second stage to about 400 to 500° F. and thus resuming the production of high quality hydrofined wax product.

6. The method of upgrading petroleum waxes which comprises treating the wax in admixture with hydrogen-rich gas in a first treating stage in contact with a catalyst selected from the group consisting of nickel oxide and cobalt oxide-molybdenum oxide at temperatures between 550 and 650° F. and at pressures between 200 and 1000 p.s.i.g., treating the reaction mixture from the first treating stage in a second treating stage in contact with catalyst selected from the group consisting of nickel oxide and cobalt oxide-molybdenum oxide at temperatures of between 400 and 500° F. and at least 100° F. lower than in the first treating stage, at essentially the same pressures as in the first treating stage, to obtain a high quality wax product from the second treating stage, continuing this procedure until the catalyst has declined in activity, due to adsorption of catalyst deactivating contaminants, to the extent that high quality wax product is no longer produced, thereupon increasing the temperature of the feed to the first stage to about 600 to 700° F. to reactivate the catalyst in the first zone, and increasing the temperature of the feed to the second stage to a temperature of about 550 to 650° F. to reactivate the catalyst in the second stage, while maintaining the first and second stages at the higher temperatures for a period of up to about 48 hours to effect desorption of the catalyst deactivating contaminants from said catalyst and thereupon reducing the temperature of the feed to the first stage to about 550 to 650° F. and the feed to the second stage to about 400 to 500° F. and thus resuming the production of high quality hydrofined wax product.

7. The method of upgrading petroleum waxes boiling in the range of 670° F.–900° F. and composed principally of normal paraffins having a carbon length of about $C_{20}$—$C_{32}$ an oil content of less than about 1% and a melting point in the range of 115–155° F. which comprises contacting the wax in admixture with hydrogen and a hydrogenation catalyst under hydrofining conditions in a first contacting zone at a temperature in the range of about 550 to 650° F. and at a pressure between 400 to 1000 p.s.i.g.; treating the reaction mixture from the first contacting zone in a second contacting zone in admixture with hydrogen, and a hydrogenation catalyst under hydrofining conditions at a temperature in the range of about 400 to 500° F. and at least 100° F. lower than the temperature in the first contacting zone and at essentially the same pressure as the first contacting zone to obtain a high quality wax product, which is essentially colorless, odorless, and tasteless, having a +25 to +30 Saybolt color or better and a USP acid of not more than 5, from the second contacting zone, continuing this procedure until the catalyst has declined in activity, due to the adsorption of catalyst deactivating contaminants, to the extent that high quality wax product is no longer produced; thereupon increasing the temperature of the feed to the first contacting zone to about 600 to 700° F. to reactivate the catalyst in the first contacting zone, and increasing the temperature of the feed to the second contacting zone to a temperature of about 550 to 650° F. to reactivate the catalyst in the second zone; maintaining the first and second stages at the higher temperatures for a period of up to about 48 hours to effect removal of the catalyst deactivating contaminants from said catalyst and thereupon reducing the temperature of the feed to the first zone to about 550 to 650° F. and temperature of the feed to the second stage to about 400 to 500° F. and thus resuming the production of high quality hydrofined wax product of the aforesaid specification.

References Cited in the file of this patent

UNITED STATES PATENTS

| | | |
|---|---|---|
| 2,116,061 | Dorrer | May 3, 1938 |
| 2,479,999 | Clark | Aug. 23, 1949 |
| 2,658,856 | Perry et al. | Nov. 10, 1953 |
| 2,746,983 | Luben et al. | May 22, 1956 |
| 2,914,470 | Johnson et al. | Nov. 24, 1959 |
| 2,915,452 | Fear | Dec. 1, 1959 |
| 2,917,448 | Beuther et al. | Dec. 15, 1959 |